United States Patent
Radhakrishnan et al.

(10) Patent No.: US 8,271,644 B2
(45) Date of Patent: Sep. 18, 2012

(54) SYSTEM AND METHOD TO MANAGE INFORMATION HANDLING SYSTEM RESOURCES IN VIRTUAL MACHINE INFRASTRUCTURE

(75) Inventors: Ramesh Radhakrishnan, Austin, TX (US); Arun Rajan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 586 days.

(21) Appl. No.: 12/487,570

(22) Filed: Jun. 18, 2009

(65) Prior Publication Data

US 2010/0325261 A1      Dec. 23, 2010

(51) Int. Cl.
*G06F 15/173* (2006.01)
(52) U.S. Cl. ........................... 709/224; 709/223
(58) Field of Classification Search .................. 709/223, 709/224
See application file for complete search history.

(56) References Cited

U.S. PATENT DOCUMENTS

2009/0210527 A1*   8/2009   Kawato ........................ 709/224

OTHER PUBLICATIONS

"Brokering Technologies for Clients Consolidation," Massimo Re Ferre', CCON Connection Broker Summary, IT20, Next Generation IT Infrastructures, Dec. 4, 2007, 18 pgs., http://it20.info/misc/brockers.htm.
U.S. Appl. No. 12/423,453, filed Apr. 14, 2009.
U.S. Appl. No. 12/362,625, filed Jan. 3, 2009.
U.S. Appl. No. 12/330,230, filed Dec. 1, 2008.
U.S. Appl. No. 12/260,477, filed Oct. 29, 2008.
U.S. Appl. No. 12/427,825, filed Apr. 22, 2009.

* cited by examiner

*Primary Examiner* — Adnan Mirza
(74) *Attorney, Agent, or Firm* — Larson Newman, LLP

(57) ABSTRACT

A method can include monitoring a proportion of a particular type of information handling system resource used by a particular virtual machine of a plurality of virtual machines. The particular virtual machine can be accessible to a thin client information handling system via a communications broker. The method can include sending first data to the communications broker, the first data indicating the proportion of the particular type of information handling system resource used by the particular virtual machine, and receiving second data from the communications broker. The second data can indicate that a greater or lesser amount of the particular type of information handling system resource is to be allocated to the particular virtual machine. The method can include automatically allocating the greater or lesser amount of the particular type of information handling system resource to the particular virtual machine in response to the second data.

17 Claims, 5 Drawing Sheets

SYSTEM AND METHOD TO MANAGE INFORMATION HANDLING SYSTEM RESOURCES IN VIRTUAL MACHINE INFRASTRUCTURE

FIELD OF THE DISCLOSURE

This disclosure relates generally to information handling systems, and more particularly relates to systems and methods to manage information handling system resources in a virtual machine infrastructure.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A virtual desktop infrastructure (VDI) solution enables virtualized personal computers (PCs) and computer desktops to run as virtual client desktops on virtualization servers located inside a data center. These virtualization servers host and connect the virtual client desktop to, in many cases, a thin client. A thin client is an endpoint for attaching user peripherals, such as the monitor, mouse, and keyboard.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
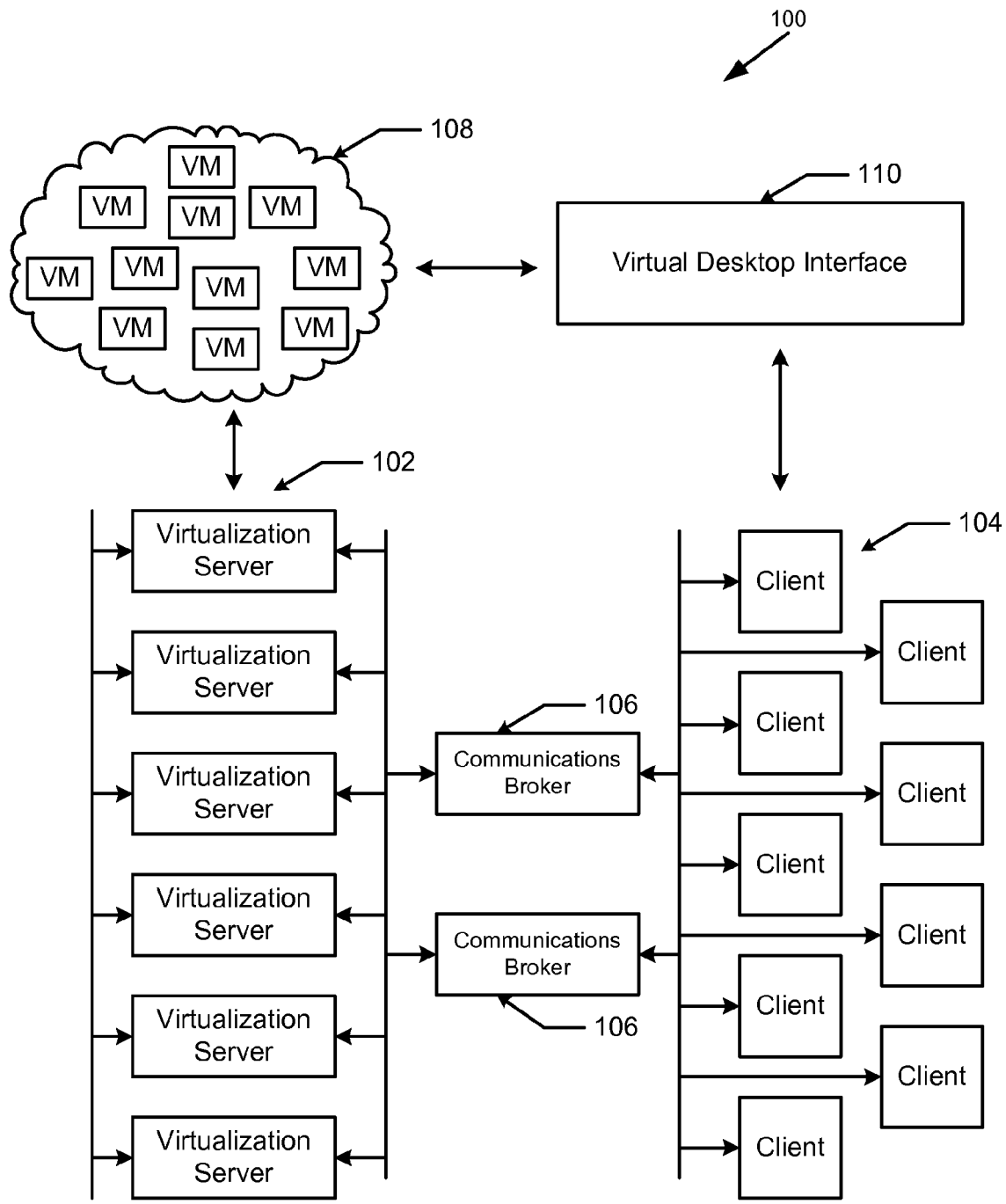
FIG. 1 is a block diagram illustrating a particular embodiment of a system to manage information handling system resources in a virtual machine infrastructure.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a particular embodiment of a system 100 to manage information handling system resources in a virtual machine infrastructure. The system 100 includes a virtualization server 102 that communicates with a plurality of thin client information handling systems ("clients") 104 via a communication broker 106. Each virtualization server 102 is adapted to provide a plurality of virtual machines 108, such as a plurality of virtual desktops. In an illustrative embodiment, the plurality of virtual machines 108 can be accessible to the clients 104 via a virtual machine interface 110.

Figure 2:
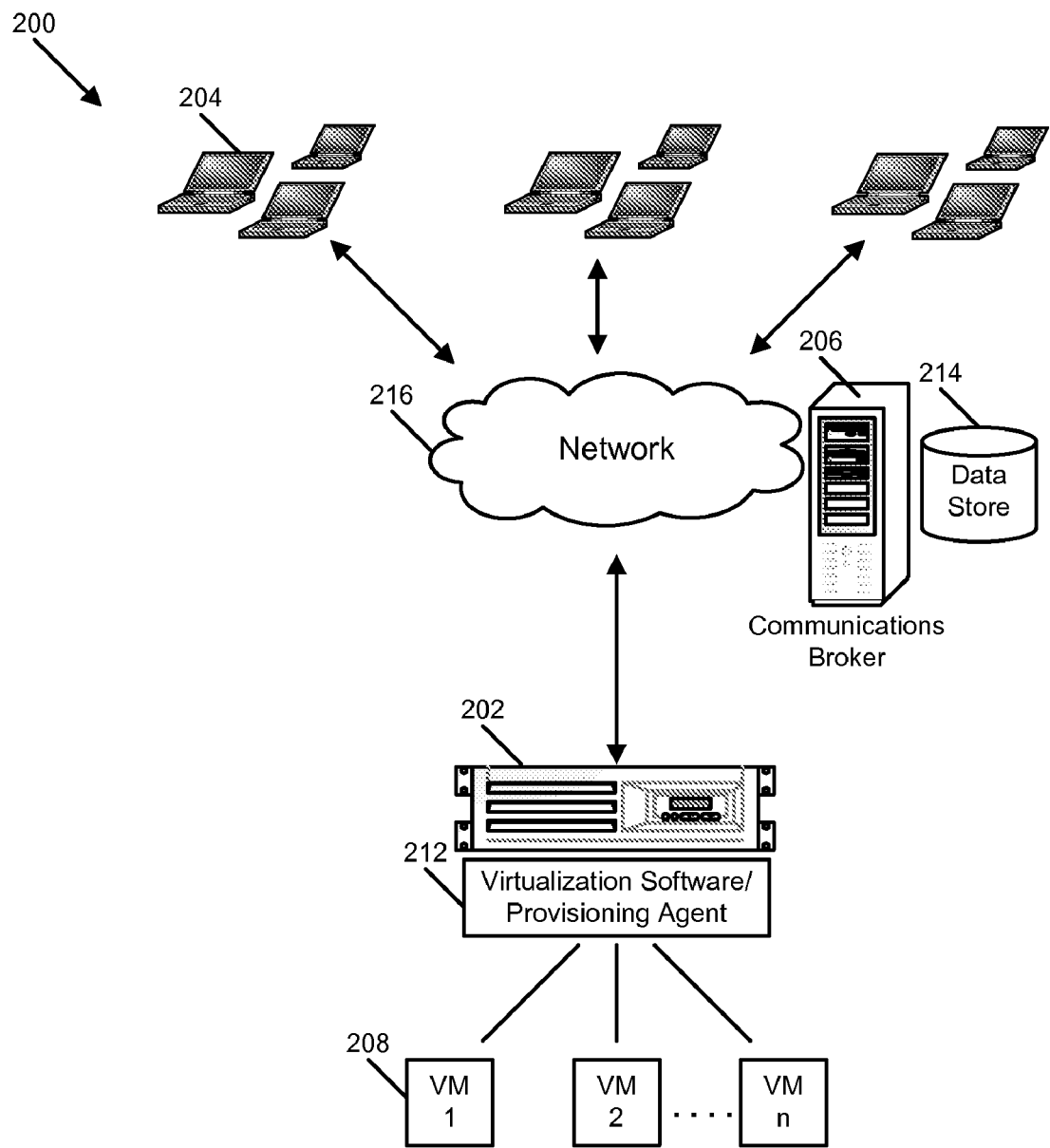
FIG. 2 is a block diagram illustrating another particular embodiment of a system to manage information handling system resources in a virtual machine infrastructure.

The communication broker 106 can be part of a network, such as the LAN/WAN network 216 illustrated in FIG. 2. A client 104 can be a terminal device or other device adapted to connect with user peripherals, such as a monitor, a mouse, a keyboard, or any combination thereof. A user can log into a client 104, for instance, and use the client 104 to access an associated virtual machine 108 via a virtualization server 102. In one embodiment, a desktop image of the virtual machine 108 can be displayed at the client 104. The virtualization server 102 can perform processing functions for the client 104 via the associated virtual machine 108.

In a particular embodiment, a virtualization server, such as the virtualization server 202 illustrated in FIG. 2, can include a virtual machine resource provisioning (VMRP) agent 212 that includes hardware, processor-readable instructions executable by processing logic (not shown) at the server 202, or a combination thereof, adapted to provide various functions of the server 202 with respect to managing information handling system resources within the virtual machine infrastructure. For instance, the VMRP agent 212 can be adapted to provide a plurality of virtual machines 208 (which can be a subset, for example, of the virtual machines 108 illustrated in FIG. 1), such as a plurality of virtual desktops. The VMRP agent 212 can be adapted to allocate an initial portion of a particular type of information handling system resource to each virtual machine 208 of a plurality of virtual machines that are accessible to a plurality of thin client information handling systems. For example, the VMRP agent 212 can be adapted to allocate to each virtual machine 208 a processor or other initial portion of processing power available at or to the server 202; an initial portion of memory that is available at or to the server 202; an initial portion of a hard disk or other disk resource available at or to the server 202; an initial portion of another resource available at or to the server 202; or any combination thereof.

In one embodiment, the VMRP agent 212 can be adapted to create a number of available virtual machines based on the availability of a particular type of resource at the server, such as a number of processors, an amount of available memory, an amount of disk space, or any combination thereof. For instance, if thirty-two processors and 64 GB of memory are available at or to the server 202, thirty-two virtual machines can be created and a processor and 2 GB of memory can initially be allocated to each virtual machine. A particular resource, such as a processor or other processing power, memory, a disk resource, another resource, or any combination thereof, can then be re-allocated among the virtual machines based on resource usage.

The VMRP agent 212 can be adapted to detect that a particular virtual machine 208 is "powered on," for instance, as a result of an associated thin client information handling system accessing the particular virtual machine. It is to be understood that powering on a virtual machine refers to causing the virtual machine to become active and not electrically powering up a physical machine. The VMRP agent 212 is adapted to monitor a proportion of the particular type of information handling system resource used by the particular virtual machine, such as a proportion of a processor or other processing power allocated to the particular virtual machine, a proportion of memory allocated to the particular virtual machine, a proportion of another information handling system resource allocated to the particular virtual machine, or any combination thereof.

In addition, the VMRP agent 212 is adapted to determine whether a monitoring period has ended and, if the monitoring period has ended, to send data from the server 202 to the communications broker 206 indicating the proportion of the particular type of information handling system resource used by the particular virtual machine during the monitoring period. In one embodiment, the VMRP agent 212 can be adapted to send data to the communications broker 206 indicating proportions of the particular type of information handling system resource used by multiple virtual machines during the monitoring period. In another embodiment, the VMRP agent 212 can be adapted to send data to the communications broker 206 indicating proportions of the particular type of information handling system resource used by a virtual machine during multiple monitoring periods.

The communications broker 206 is adapted to receive data from the VMRP agent 212 indicating a proportion of a particular information handling system resource used by a particular virtual machine. The communications broker 206 can be adapted to receive the data as an electronic message or in another form. The communications broker 206 can be adapted to store the data with a history of resource usage data related to the virtual machine. For instance, the communications broker 206 can be adapted to store the data at the data store 214 integrated with, or communicating with, the communications broker 206.

In a particular embodiment, the communications broker 206 can be adapted to display an electronic message received from the VMRP agent 212. The communications broker 206 can be adapted to receive input, from a system administrator, for example, indicating a re-allocation of the particular type of information handling system resource for the particular virtual machine, such as a greater amount or lesser amount of the particular type of information handling system resource that is to be allocated to the particular virtual machine. The re-allocation can be based on the proportion of the particular type of information handling system resource by the particular virtual machine, on another criterion, or any combination thereof.

In another embodiment, the communications broker 206 can be adapted to automatically generate data (via a resource allocation engine, for example) indicating the re-allocation of the particular type of information handling system resource for the particular virtual machine, such as a greater amount or lesser amount of the particular type of information handling system resource, based on the proportion of the particular type of information handling system resource that is indicated in the data received from the VMRP agent 212, on another criterion, or any combination thereof. The communications broker 206 is adapted to send the other data to the virtual machine.

The VMRP agent 212 is adapted to receive data from the communications broker 206 that instructs the VMRP agent 212 to allocate a greater amount or lesser amount of the particular type of information handling system resource to the particular virtual machine. If the VMRP agent 212 is to decrease the allocation of the particular type of information handling system resource to the particular virtual machine, the VMRP agent 212 is adapted to allocate the lesser amount of the particular type of information handling system resource to the particular virtual machine.

In an illustrative embodiment, the VMRP agent 212 can be adapted to receive additional data from the communications broker indicating that more of the particular type of information handling system resource is to be allocated to another virtual machine. When the lesser amount of the particular type of information handling system resource is allocated to the particular virtual machine, the VMRP agent 212 can be adapted to allocate a portion of the particular type of information handling system resource previously used by the particular virtual machine to the other virtual machine.

In a particular embodiment, if the VMRP agent 212 is to allocate a greater amount of the particular type of information handling system resource to the particular virtual machine, the VMRP agent 212 can be adapted to determine whether more of the particular information handling system resource is available at the server 202. This can entail determining whether any of the particular information handling system resource is available at the server 202, whether the greater amount of the particular information handling resource that is to be allocated to the particular virtual machine is available at the server 202, or a combination thereof. If so, the VMRP agent 212 can be adapted to allocate the greater amount of the particular type of information handling system resource to the particular virtual machine at the server 202.

In a particular embodiment, if the VMRP agent 212 determines that a greater amount of the particular information handling resource that is to be allocated to the particular virtual machine is not available at the server 202, the VMRP agent 212 can be adapted to allocate the greater amount of the particular type of information handling system resource to the virtual machine at another server. Further, the VMRP agent 212 can be adapted to migrate the particular virtual machine to the other server.

In an illustrative embodiment, the VMRP agent 212 can be adapted to determine a "hot plug" status of a client associated with the particular virtual machine, before re-allocating the particular type of resource to the particular virtual machine. That is, the VMRP agent 212 can be adapted to determine whether the client must be rebooted or another similar event must occur before a change in the particular type of resource can take effect or whether the change can take place without interrupting use of the particular virtual machine by the client. Depending on the hot plug status of the client associated with the particular virtual machine, the VMRP agent 212 can be adapted to allocate the greater or lesser amount of the particular type of resource to the particular virtual machine after a log out or power off event is detected at the client, or at another time, such as substantially immediately after receiving the data indicating that the allocation is to be changed. For example, if the client must be rebooted for changes in the allocation of the particular type of information handling system resource to take effect, the VMRP agent 212 can be adapted to change the allocation after detecting a log out or power off event at the client.

Changes in allocation of a particular type of information handling system resource can be static or dynamic. For example, the VMRP agent 212 can be adapted to change an allocation of a particular type of information handling system resource until it is instructed to change the allocation again by the communications broker. In another example, the VMRP agent 212 can be adapted to change an allocation of a particular type of information handling system resource periodically as a result of data received from the communications broker 206. For instance, the VMRP agent 212 can send data indicating a morning proportion of the particular type of information handling system resource used by the particular virtual machine at a periodic time (such as 9 a.m.). Other data stored by the communications broker 206 can indicate that an evening proportion of the particular type of information handling system resource is used by the particular virtual machine at another periodic time (such as after 5 p.m.). Data received by the VMRP agent 212 from the communications broker 206 can indicate that the morning proportion of the particular type of information handling system resource is to be allocated to the virtual machine at the periodic time and the evening proportion of the particular type of information handling system resource is to be allocated to the particular virtual machine at the other periodic time.

Figure 3:
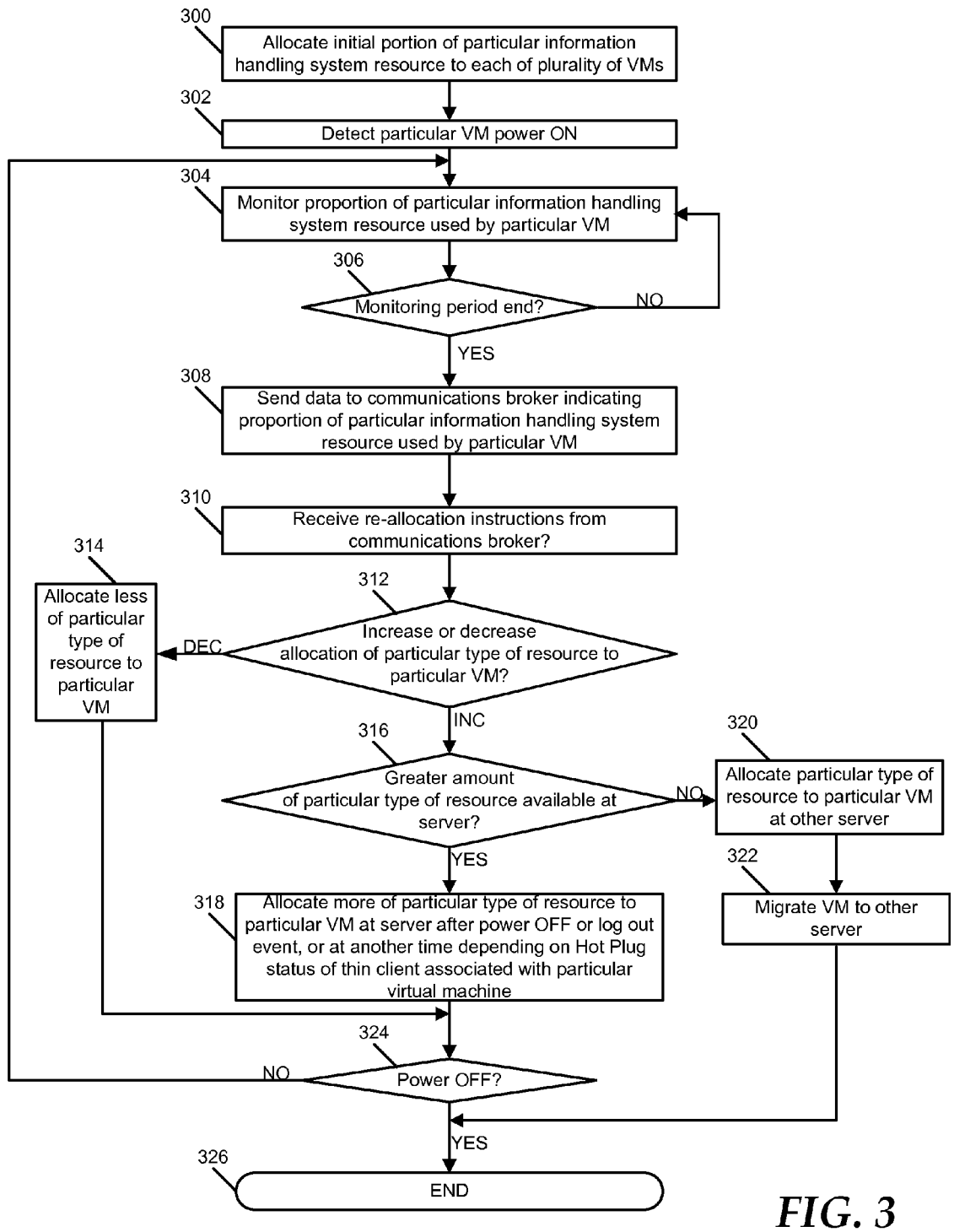
FIG. 3 is a flow diagram illustrating a particular embodiment of a method of managing information handling system resources in a virtual machine infrastructure.

FIG. 3 illustrates a particular embodiment of a method of managing information handling system resources in a virtual machine infrastructure. At block 300, a virtual machine resource provisioning (VMRP) agent at a server allocates an initial portion of a particular type of information handling system resource to each virtual machine of a plurality of virtual machines that are accessible to a plurality of thin client information handling systems. Moving to block 302, the VMRP agent detects that a particular virtual machine is powered on, for instance, as a result of an associated thin client information handling system accessing the particular virtual machine.

Proceeding to block 304, the VMRP agent monitors a proportion of the particular type of information handling system resource, such as a proportion of a processor or other processing power allocated to the particular virtual machine, a proportion of the memory allocated to the particular virtual machine, a proportion of the disk resource allocated to the particular virtual machine, a proportion of another information handling system resource allocated to the particular virtual machine, or any combination thereof, used by the particular virtual machine. Continuing to decision node 306, the VMRP agent determines whether a monitoring period has ended. If not, the method returns to block 304.

If the monitoring period has ended, the method advances to block 308, and the VMRP agent sends data from the server to the communications broker indicating the proportion of the particular type of information handling system resource used by the particular virtual machine during the monitoring period. In one embodiment, the VMRP agent can send data to the communications broker indicating proportions of the particular type of information handling system resource used by multiple virtual machines during the monitoring period. In another embodiment, the VMRP agent can send data to the communications broker indicating proportions of the particular type of information handling system resource used by a virtual machine during multiple monitoring periods.

At block 310, the VMRP agent receives data from the communications broker that instructs the VMRP agent to change the allocation of the particular type of information handling system resource to the particular virtual machine. Moving to decision node 312, the VMRP agent determines whether it is to increase or decrease the allocation of the particular type of information handling system resource to the particular virtual machine. If the VMRP agent is to decrease the allocation of the particular type of information handling system resource, the method proceeds to block 314, and the VMRP agent allocates a lesser amount of the particular type of information handling system resource to the particular virtual machine. The method then advances to decision node 324.

Returning to decision node 312, if the VMRP agent is to allocate a greater amount of the particular type of information handling system resource, the method proceeds to decision node 316, and the VMRP agent determines whether the greater amount of the particular information handling resource that is to be allocated to the particular virtual machine is available at the server. If so, the method continues to block 318, and the VMRP agent allocates the greater amount of the particular type of information handling system resource to the particular virtual machine at the server.

Depending on the hot plug status of a thin client information handling system associated with the particular virtual machine, the VMRP agent can allocate the greater amount of the particular type of information handling resource to the particular virtual machine after a log out or power off event is detected at the client, or at another time. For example, if the thin client information handling system must be rebooted for changes in the allocation of the particular type of information handling system resource to take effect, the VMRP agent can change the allocation after detecting a log out or power off event at the thin client information handling system. The method then advances to decision node 324.

Returning to decision node 316, if the VMRP agent determines that the greater amount of the information handling resource that is to be allocated to the particular virtual machine is not available at the server, the method advances to block 320, and VMRP agent allocates the greater amount of the particular type of information handling system resource to the virtual machine at another server. At block 322, the VMRP agent can migrate the particular virtual machine to the other server.

At decision node 324, the VMRP agent can determine whether the particular virtual machine has powered off. If not, the method returns to block 304. The method terminates at 326.

Figure 4:
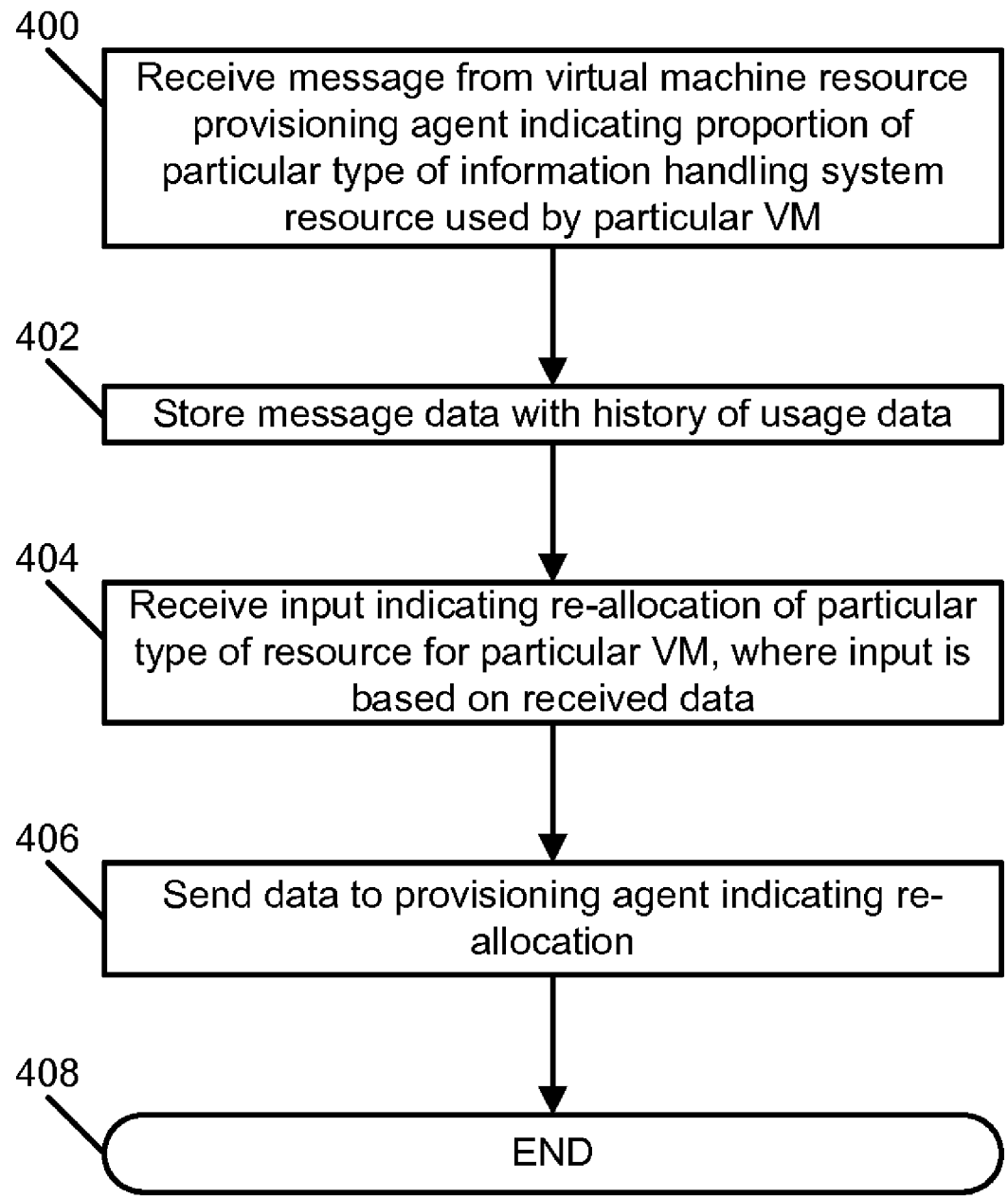
FIG. 4 is a flow diagram illustrating another particular embodiment of a method of managing information handling system resources in a virtual machine infrastructure.

FIG. 4 illustrates another particular embodiment of a method of managing information handling system resources in a virtual machine infrastructure. At block 400, a communications broker receives a message from a virtual machine resource provisioning agent indicating a proportion of a particular information handling system resource used by a virtual machine provided by a server. Moving to block 402, in a particular embodiment, the communications broker can store the message with a history of resource usage data related to the virtual machine. For instance, the communications broker can store the message at a data store integrated with or communicating with the communications broker.

Proceeding to block 404, the communications broker can receive input indicating a re-allocation of the particular type of information handling system resource for the particular virtual machine. The input is based partially on the proportion of the particular type of information handling system resource that is indicated in the message received at block 400. Continuing to block 406, the communications broker sends data indicating that a greater amount or lesser amount of the particular type of information handling system resource is to be allocated to the virtual machine. The method ends at 408.

Figure 5:
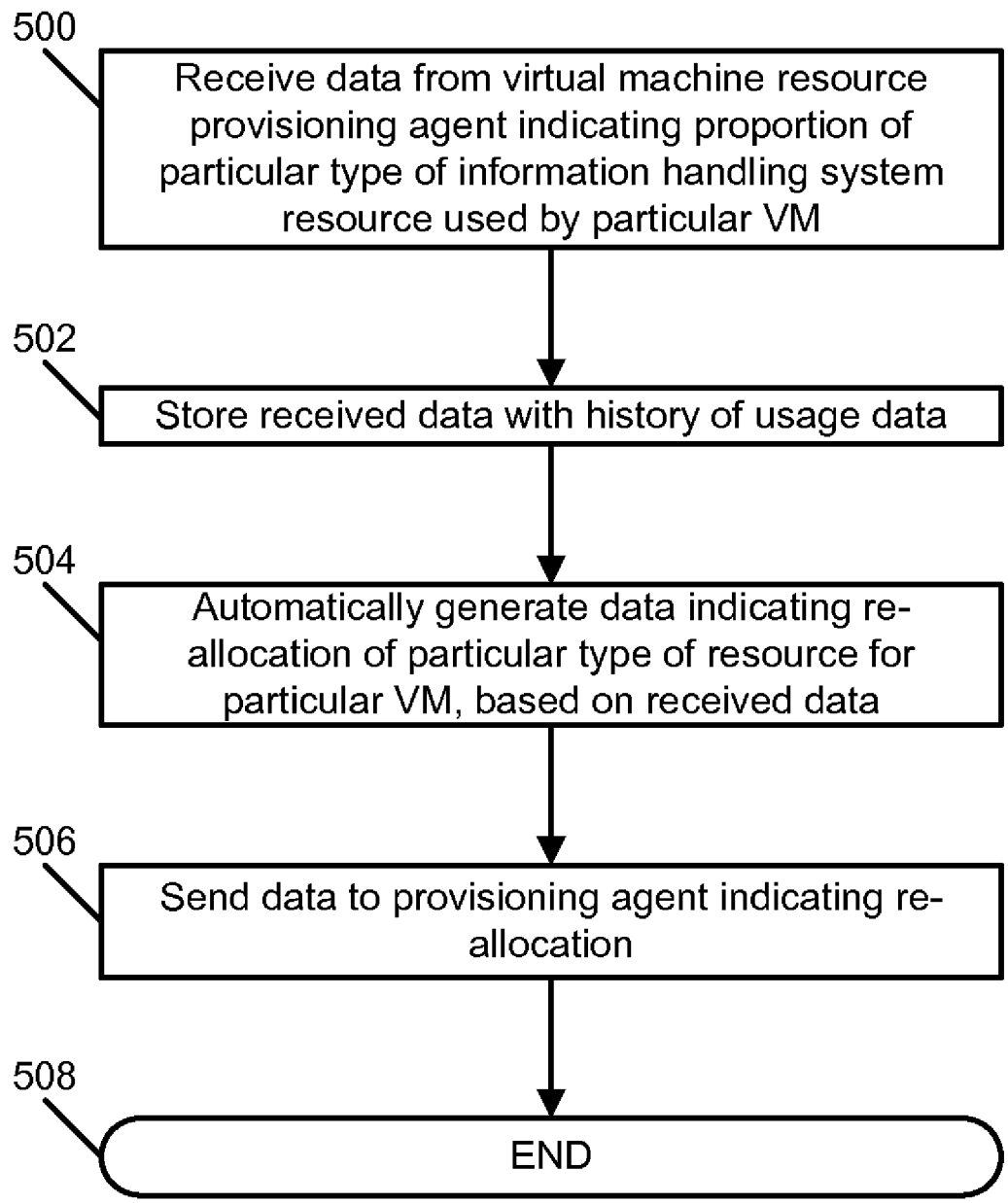
FIG. 5 is a flow diagram illustrating a further particular embodiment of a method of managing information handling system resources in a virtual machine infrastructure.

FIG. 5 illustrates a further particular embodiment of a method of managing information handling system resources in a virtual machine infrastructure. At block 500, a communications broker receives data from a virtual machine resource provisioning agent indicating a proportion of a particular information handling system resource used by a virtual machine provided by a server. Moving to block 502, in a particular embodiment, the communications broker can store the data with a history of resource usage data related to the virtual machine. For instance, the communications broker can store the data at a data store integrated with or communicating with the communications broker.

Proceeding to block 504, the communications broker can automatically generate other data indicating a re-allocation of the particular type of information handling system resource for the particular virtual machine, such as a greater amount or lesser amount of the particular type of information handling system resource. The other data is based partially on the proportion of the particular type of information handling system resource that is indicated in the data received at block 500. Continuing to block 506, the communications broker sends the other data to the virtual machine. The method ends at 508.

In accordance with the embodiments disclosed herein, systems and methods of managing information handling system resources in a virtual machine infrastructure are provided, to dynamically allocate resources such as processing power, memory, disk space, another resource, or any combination thereof, among virtual machines based on resource usage. Thus, in one example, if a particular virtual machine is used to run processor-intensive applications, and another is not, processing power can be allocated between the virtual machines to prevent bottlenecking at the particular virtual machine and to prevent waste of processing power at the other virtual machine.

In some embodiments, the methods disclosed herein can be performed as described. In other embodiments, certain aspects of the methods can be performed in alternative sequences or simultaneously.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method of managing information handling system resources can include monitoring a proportion of a particular type of information handling system resource used by a particular virtual machine of a plurality of virtual machines. The particular virtual machine is accessible to a thin client information handling system via a communications broker. The method can also include sending first data to the communications broker, the first data indicating the proportion of the particular type of information handling system resource used by the particular virtual machine. The method can also include receiving second data from the communications broker, the second data indicating that a greater or lesser amount of the particular type of information handling system resource is to be allocated to the particular virtual machine. Further, the method can include automatically allocating the greater or lesser amount of the particular type of information handling system resource to the particular virtual machine in response to the second data.

In an embodiment of the first aspect, the method can include allocating an initial portion of the particular type of information handling system resource to each of the plurality of virtual machines.

In another embodiment of the first aspect, the particular type of information handling resource includes a processor, a portion of processing power, a portion of memory, a portion of a disk resource, or any combination thereof.

In a further embodiment of the first aspect, the method can include sending an electronic message to the communications broker. In an alternative embodiment of the first aspect, sending the first data includes sending the first data to a resource allocation engine at the communications broker.

In yet another embodiment of the first aspect, the method can include, when the second data indicates that a greater amount of the particular type of information handling system resource is to be allocated to the virtual machine, determining whether more of the particular type of information handling system resource is available at a server. The particular virtual machine can be accessible to the thin client information handling system via the server.

In still another embodiment of the first aspect, the method can include determining whether more of the particular type of information handling system resource is available at the server includes determining whether the greater amount of the particular type of information handling system resource is available at the server.

In another embodiment of the first aspect, the method can include determining whether more of the particular type of information handling system resource is available at the server includes determining whether any of the particular type of information handling system resource is available at the server.

In a further embodiment of the first aspect, the method can include, when the greater amount of the particular type of information handling system resource is not available at the server, determining that more of the particular type of information handling system resource is available at another server and allocating a portion of the particular type of information handling system resource at the other server to the particular virtual machine.

In an additional embodiment of the first aspect, the virtual machine can include a virtual desktop accessible to the thin client information handling system.

According to a second aspect, a method of managing information handling system resources can include receiving first data from a virtual machine resource provisioning agent at a communications broker via a network. The first data can indicate a proportion of a particular type of information handling system resource used by a virtual machine that is accessible to a thin client information handling system via the communications broker. The method can also include sending second data from the communications broker to the virtual machine resource provisioning agent via the network. The second data can indicate a greater or lesser amount of the particular type of information handling system resource that is to be allocated to the particular virtual machine and wherein the second data is based partially on the first data.

In an embodiment of the second aspect, the method can also include storing a resource usage history associated with the particular virtual machine. The resource usage history includes the first data and other stored data indicating another proportion of the particular type of information handling system resource used by the particular virtual machine. The second data can be partially based on the first data and the other stored data.

In another embodiment of the second aspect, the first data indicates that a first amount of the particular type of information handling system resource is used by the particular virtual machine at a first periodic time. Further, the other stored data can indicate that a second amount of the particular type of information handling system resource is used by the particular virtual machine at another periodic time. Additionally, the second data indicates that the first amount of the particular type of information handling system resource is to be allocated to the virtual machine at a future instance of the first periodic time and that the second amount of the particular type of information handling system resource is to be allocated to the virtual machine at a future instance of the other periodic time.

In a further embodiment of the second aspect, the method can include automatically generating the second data at the communications broker.

In yet another embodiment of the second aspect, the method can include generating the second data at the communications broker based on input received at the communications broker, the input indicating the greater or lesser amount of the particular type of information handling system resource that is to be allocated to the particular virtual machine.

According to a third aspect, a computer-readable medium can include processor-readable instructions that are executable by a processor to perform a method, the method comprising monitoring a proportion of a particular type of information handling system resource used by a particular virtual machine of a plurality of virtual machines, where the particular virtual machine is accessible to a thin client information handling system via a communications broker; sending first data to the communications broker, the first data indicating the proportion of the particular type of information handling system resource used by the particular virtual machine; receiving second data from the communications broker, the second data indicating that a greater or lesser amount of the particular type of information handling system resource is to be allocated to the particular virtual machine; and automatically allocating the greater or lesser amount of the particular type of information handling system resource to the particular virtual machine in response to the second data In an embodiment of the third aspect, the method can also include determining whether allocating the greater or lesser amount of the particular type of information handling system resource to the particular virtual machine requires the thin client information handling system to reboot; detecting a power off or log out event at the thin client information handling system; and allocating the greater or lesser amount of the particular type of information handling system resource to the particular virtual machine after the power off or log out event.

In another embodiment of the third aspect, the method can also include causing the thin client information handling system to reboot, in response to detecting a log out event.

In a further embodiment of the third aspect, the method can also include receiving third data from the communications broker, the third data indicating that more of the particular type of information handling system resource is to be allocated to another virtual machine of the plurality of virtual machines; and, when the lesser amount of the particular type of information handling system resource is allocated to the particular virtual machine in response to the second data, allocating a portion of the particular type of information handling system resource previously used by the particular virtual machine to the other virtual machine.

In yet another embodiment of the third aspect, the method can include allocating an initial portion of the particular type of information handling system resource to each of the plurality of virtual machines before monitoring the proportion of the particular type of information handling system resource used by the particular virtual machine. In still another embodiment of the third aspect, the method can include allocating an equal initial portion of the particular type of information handling system resource to each of the plurality of virtual machines.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing information handling system resources, the method comprising:
    monitoring a proportion of an information handling system resource used by a virtual machine, wherein the virtual machine is accessible to a thin client information handling system via a communications broker;
    sending first data to the communications broker, the first data indicating the proportion of the information handling system resource used by the virtual machine;
    receiving second data from the communications broker, the second data indicating that a different amount of the of information handling system resource is to be allocated to the virtual machine;
    automatically allocating the different amount of, but not none of, the information handling system resource to the virtual machine in response to the second data; and
    when the second data indicates that a greater amount of the information handling system resource is to be allocated to the virtual machine, determining whether more of the information handling system resource is available at a server, wherein the virtual machine is accessible to the thin client information handling system via the server.

2. The method of claim 1, further comprising allocating an initial portion of the information handling system resource to the virtual machine.

3. The method of claim 1, wherein the information handling resource includes at least one of a processor, a portion of processing power, a portion of memory, and a portion of a disk resource.

4. The method of claim 1, wherein sending the first data includes sending an electronic message including the data to the communications broker.

5. The method of claim 1, wherein sending the first data includes sending the first data to a resource allocation engine at the communications broker.

6. The method of claim 1, wherein determining whether more of the information handling system resource is available at the server includes determining whether any of the information handling system resource is available at the server.

7. The method of claim 1, wherein determining whether more of the information handling system resource is available at the server includes determining whether the greater amount of the information handling system resource is available at the server.

8. The method of claim 7, wherein, when the greater amount of the information handling system resource is not available at the server, determining that more of the information handling system resource is available at another server and allocating a portion of the information handling system resource at the other server to the virtual machine.

9. The method of claim 1, wherein the virtual machine includes a virtual desktop accessible to the thin client information handling system.

10. A method of managing information handling system resources, the method comprising:
receiving first data from a virtual machine resource provisioning agent at a communications broker via a network, the first data indicating a proportion of an information handling system resource used by a virtual machine that is accessible to a thin client information handling system via the communications broker;
sending second data from the communications broker to the virtual machine resource provisioning agent via the network, wherein the second data indicates a different, non-zero, amount of the information handling system resource that is to be allocated to the virtual machine and wherein the second data is based on the first data; and
storing a resource usage history associated with the virtual machine, wherein the resource usage history includes the first data and other stored data indicating another proportion of the information handling system resource used by the virtual machine, and wherein the second data is partially based on the first data and the other stored data.

11. The method of claim 10, wherein:
the first data indicates that a first amount of the information handling system resource is used by the virtual machine at a first periodic time;
the other stored data indicates that a second amount of the information handling system resource is used by the virtual machine at another periodic time; and
the second data indicates that the first amount of the information handling system resource is to be allocated to the virtual machine at a future instance of the first periodic time and that the lesser amount of the information handling system resource is to be allocated to the virtual machine at a future instance of the other periodic time.

12. The method of claim 10, further comprising automatically generating the second data at the communications broker.

13. The method of claim 10, further comprising generating the second data at the communications broker based on input received at the communications broker, the input indicating the different amount of the information handling system resource that is to be allocated to the virtual machine.

14. A non-transitory computer-readable medium including processor-readable instructions that are executable by a processor to perform a method, the method comprising:
monitoring a proportion of an information handling system resource used by a first virtual machine, wherein the first virtual machine is accessible to a thin client information handling system via a communications broker;
sending first data to the communications broker, the first data indicating the proportion of the information handling system resource used by the first virtual machine;
receiving second data from the communications broker, the second data indicating that a different amount of the information handling system resource is to be allocated to the first virtual machine;
automatically allocating the different amount of, but not none of, the information handling system resource to the first virtual machine in response to the second data; and
allocating an equal initial portion of the information handling system resource to the first virtual machine, before monitoring the proportion of the information handling system resource used by the first virtual machine.

15. The non-transitory computer-readable medium of claim 14, wherein the method further comprises:
determining whether allocating the different amount of the information handling system resource to the first virtual machine requires the thin client information handling system to reboot;
detecting at least one of a power off event and a log out event at the thin client information handling system; and
allocating the different amount of the information handling system resource to the first virtual machine after the power off or log out event.

16. The non-transitory computer-readable medium of claim 15, further comprising causing the thin client information handling system to reboot, in response to detecting a log out event.

17. The non-transitory computer-readable medium of claim 14, wherein the method further comprises:
receiving third data from the communications broker, the third data indicating that more of the information handling system resource is to be allocated to a second virtual machine; and
when the lesser amount of the information handling system resource is allocated to the first virtual machine in response to the second data, allocating a portion of the information handling system resource previously used by the first virtual machine to the second virtual machine.

* * * * *